G. Bowerman.
Feeding Fowls.
Nº 70,401. Patented Nov. 6, 1867.
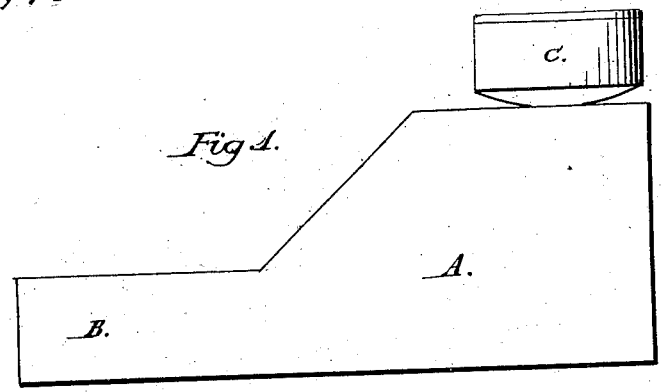
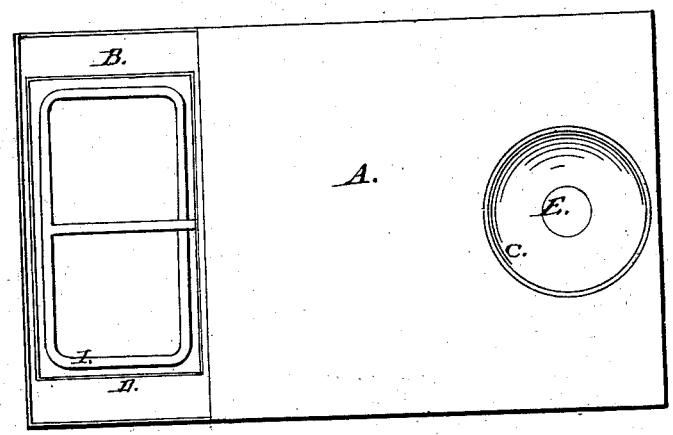
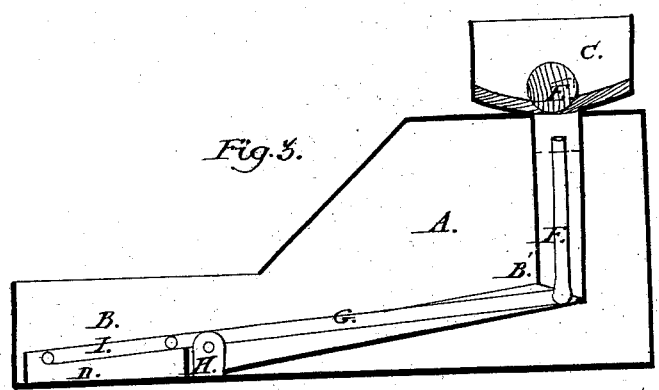
Witnesses:
W. H. Burridge
J. Holmes
Inventor:
G. Bowerman

United States Patent Office.

GEORGE BOWERMAN, OF NAPOLEON, OHIO.

Letters Patent No. 70,401, dated November 5, 1867.

---

IMPROVEMENT IN STOCK AND POULTRY-FEEDER.

---

*The Schedule referred to in these Letters Patent and making part of the same.*

---

TO ALL WHOM IT MAY CONCERN:

Be it known that I, GEORGE BOWERMAN, of Napoleon, in the county of Henry, and State of Ohio, have invented certain new and useful improvements in Stock and Poultry-Feeder, &c.; and I do hereby declare that the following is a full and complete description of the same, reference being had to the accompanying drawings, making a part of this specification, in which—

Figure 1 is a side view of the feeder.

Figure 2 is a top view.

Figure 3 is a longitudinal section.

Like letters of reference refer to like parts in the views.

In fig. 1, A represents the body or case of the feeder, which may be constructed of wood, or any other suitable material, and of any desired size and shape, the front end, B, being made lower and open, as shown in fig. 2, and from which end the stock or poultry feed out of a small bin or box, D, seen in figs. 2 and 3, the bin D being supplied with grain or feed from the bin C through the pipe B', fig. 3. C is a bin for holding the grain, secured above and connected to the case A, as shown in fig. 3, the bottom being concave, as shown, so that the ball will roll into its seat when the lever is depressed. In the bottom of the bin is a ball-valve, E, for the purpose of shutting off the flow of grain from the case below, and which valve is operated by the stem F connected to the long arm of the lever G, said lever being pivoted in the stay H. On the front or short arm of the lever is a frame, I, and by which the lever and valve are operated as follows:

The feeder being placed in some convenient place, the cattle coming to feed will press down the frame I, which, as a consequence, will throw up the long arm of the lever, and thus open the valve, and allow the grain to pass down through the tube or trough B' into the bin D, and thereby supply them with feed.

When the feeder is for poultry the frame I is covered with a wire gauze, so that, when they go for feed, their bills, hitting on the wire, will throw up the long arm of the lever, as above described. On the stock withdrawing their heads from the bin the long arm of the lever will fall back in place, and the stem F allow the ball to roll down into its seat, and thus shut off a further flow of grain, but which will again be supplied in the manner above described, the grain, each time, being supplied fresh and clean from the bin C.

This machine can be employed for watering stock, in which case the bin C can be used as a reservoir, and, if thought desirable, when a large amount of water is required, the small bin D and tube B' can be taken out and the water allowed to flow into the large case A. Thus grain or water can be given them, and at the same time kept clean and fresh, when it cannot be where it stands in a tank.

What I claim as my improvement, and desire to secure by Letters Patent, is—

The bin or reservoir C, valve E, in combination with the rod F, lever G, and case A, constructed and arranged as and for the purpose set forth.

G. BOWERMAN.

Witnesses:
J. A. KING,
W. F. DOGGETT